(12) United States Patent
Garza et al.

(10) Patent No.: US 10,512,345 B2
(45) Date of Patent: Dec. 24, 2019

(54) METHOD OF ASSEMBLING A DOUBLE-WALLED CONTAINER

(71) Applicant: DART CONTAINER CORPORATION, Mason, MI (US)

(72) Inventors: Dean Garza, Williamston, MI (US); Rick Hills, Jackson, MI (US); Daniel Wendt, Oak Park, IL (US)

(73) Assignee: Dart Container Corporation, Mason, MI (US)

( * ) Notice: Subject to any disclaimer, the term of this patent is extended or adjusted under 35 U.S.C. 154(b) by 316 days.

(21) Appl. No.: 15/460,313

(22) Filed: Mar. 16, 2017

(65) Prior Publication Data

US 2018/0263391 A1 Sep. 20, 2018

(51) Int. Cl.
| | |
|---|---|
| A47G 19/22 | (2006.01) |
| B65D 81/38 | (2006.01) |
| B29C 65/48 | (2006.01) |
| B29L 31/00 | (2006.01) |
| B31B 50/02 | (2017.01) |
| B65D 3/22 | (2006.01) |
| B29C 65/50 | (2006.01) |
| B29C 65/78 | (2006.01) |
| B29C 65/00 | (2006.01) |

(52) U.S. Cl.
CPC ..... *A47G 19/2205* (2013.01); *B65D 81/3869* (2013.01); *B29C 65/48* (2013.01); *B29C 65/5057* (2013.01); *B29C 65/7847* (2013.01); *B29C 66/1122* (2013.01); *B29C 66/545* (2013.01); *B29C 66/727* (2013.01); *B29C 66/72328* (2013.01); *B29C 66/7486* (2013.01); *B29L 2031/7132* (2013.01); *B31B 50/02* (2017.08); *B31B 50/022* (2017.08); *B31B 50/024* (2017.08); *B65D 3/22* (2013.01); *B65D 81/3874* (2013.01)

(58) Field of Classification Search
CPC .. B65D 81/3874; B65D 81/3869; B65D 3/22; B31B 50/02; B31B 50/022; B31B 50/024
See application file for complete search history.

(56) References Cited

U.S. PATENT DOCUMENTS

| | | | |
|---|---|---|---|
| 5,269,864 | A | 12/1993 | Otruba |
| 5,429,346 | A | 7/1995 | Andersson et al. |
| 6,406,415 | B1 | 6/2002 | Haggman |
| 6,471,802 | B1 | 10/2002 | Williamson |
| 6,520,899 | B1 | 2/2003 | Haggman |

(Continued)

FOREIGN PATENT DOCUMENTS

WO 2012141821 A1 10/2012

OTHER PUBLICATIONS

Notification of Transmittal of the International Search Report and the Written Opinion of the International Searching Authority for Counterpart PCT/US2018/022599, dated Jul. 19, 2018.

*Primary Examiner* — Carson Gross
(74) *Attorney, Agent, or Firm* — McGarry Bair PC (57) ABSTRACT

A method of making a double-wall cup having an inner cup defining an inner wall and an outer wrapper defining an outer wall, the method comprising applying an adhesive on the inner wall, holding a portion of the wrapper, at a location between opposing ends of the wrapper, in contact with the adhesive while in spaced relationship with the inner wall to define a spaced condition, and wrapping the wrapper about the inner wall.

20 Claims, 8 Drawing Sheets

(56) References Cited

U.S. PATENT DOCUMENTS

| | | |
|---|---|---|
| 6,612,973 B2 | 9/2003 | Haggman |
| 7,104,032 B2 | 9/2006 | Spatafora et al. |
| 8,603,276 B2 * | 12/2013 | Riethmueller ........... B65D 3/22 156/191 |
| 2006/0144915 A1 * | 7/2006 | Sadlier ................... B65D 3/22 229/403 |
| 2012/0264581 A1 | 10/2012 | Babinsky et al. |
| 2015/0291313 A1 | 10/2015 | Vara |
| 2016/0135629 A1 | 5/2016 | Robertson |
| 2017/0113831 A1 * | 4/2017 | Aubele ................... B65D 3/04 |

* cited by examiner

METHOD OF ASSEMBLING A DOUBLE-WALLED CONTAINER

BACKGROUND

Insulated containers, such as cups, can be used to store hot or cold beverages or food while providing a consumer holding the container with some protection from the temperature of the items stored in the container. Various methods, containers, and auxiliary devices for providing insulation to a container to keep the contents of the container warm/cold and to lessen the effects of the transfer of heat to or from a user's hand are known in the art. One such method includes providing a double-walled container having an inner cup and an outer wrapper. The inner cup and the outer wrapper can both be formed, for example, of paper and can additionally be provided with a coating on one or more surfaces. The outer wrapper and the inner cup can be maintained in a spaced condition to one another, defining an air gap therebetween. Forming such a cup to maintain the spaced condition can increase the complexity and cost of the manufacturing process.

BRIEF SUMMARY

In one aspect, illustrative embodiments in accordance with the present disclosure relate to a method of making a double-wall cup having an inner cup defining an inner wall and an outer wrapper defining an outer wall, the method comprising applying an adhesive on the inner wall, holding a portion of the wrapper, at a location between opposing ends of the wrapper, in contact with the adhesive while in spaced relationship with the inner wall to define a spaced condition, and wrapping the opposing ends of the wrapper about the inner wall while holding the wrapper in the spaced condition.

In another aspect, illustrative embodiments in accordance with the present disclosure relate to a method of making a double-wall cup comprising applying a spacer to a wall of a sleeve, holding a portion of a wrapper, at a location between opposing ends of the wrapper, in contact with the spacer yet in spaced relationship with the inner wall to define a spaced condition, and wrapping the opposing ends of the wrapper about the wall while holding the wrapper in the spaced condition.

The various features in this application illustrate examples of double-walled cups and portions thereof according to this disclosure. The figures referred to above are not necessarily drawn to scale, should be understood to provide a representation of particular embodiments of the disclosure, and are merely conceptual in nature and illustrative of the principles involved. Some features of the double-walled cups depicted in the drawings may have been enlarged or distorted relative to others to facilitate explanation and understanding.

DETAILED DESCRIPTION

Cups described herein are susceptible of embodiments in many different forms. Thus, the embodiments shown in the drawings and described in detail below exemplify the principles of the disclosure and are not intended to limit the broad aspects of the disclosure. Particularly, a double-walled container is generally described and shown herein as a cup for containing hot liquid, such as coffee, tea, etc. However, it should be understood that the present disclosure may take the form of many different types of vessels or containers for holding heated contents, including but not limited to liquids and non-liquids such as beverages, soups, stews, chili, noodles, etc. Additionally, a person skilled in the art would readily recognize that the double-walled vessel or container of the present disclosure may also be used to insulate cold contents, such as an ice-cold beverage, in addition to hot beverages.

Figure 1:
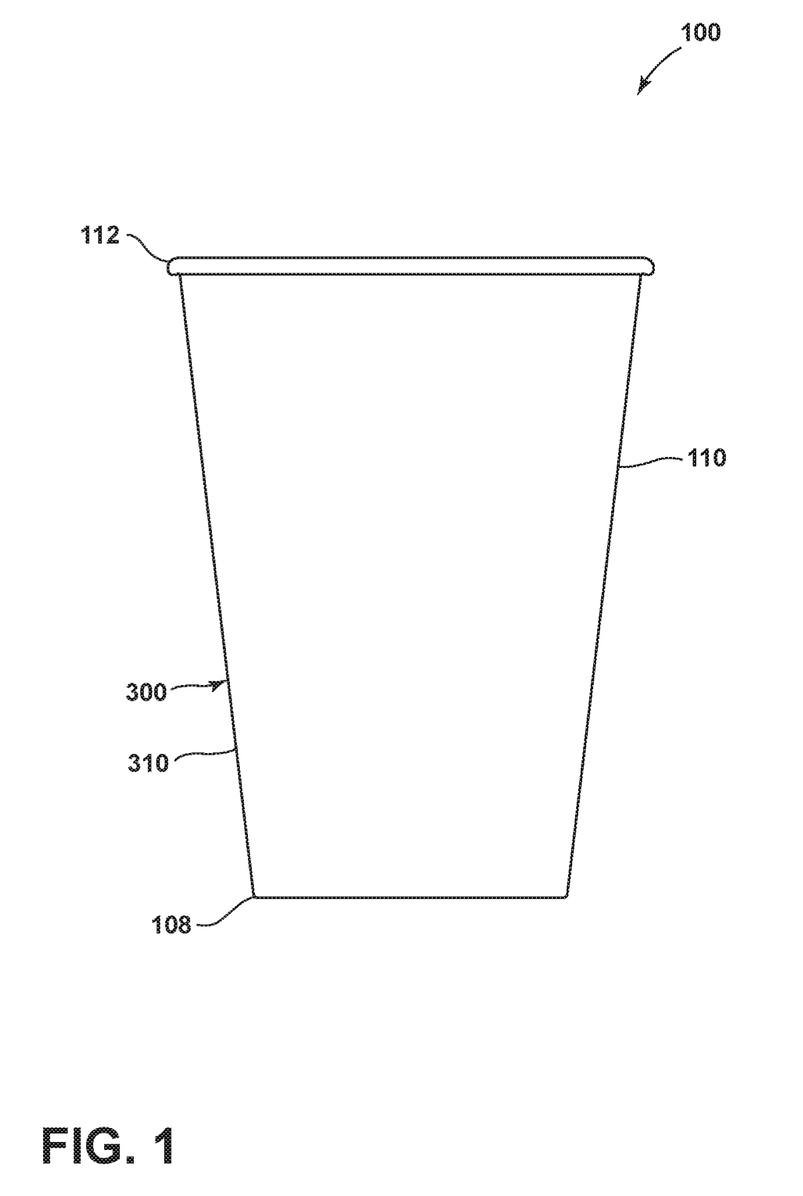
FIG. 1 is a front elevation view of a double-walled cup having an inner cup and an outer wrapper according to an embodiment of the disclosure.
Figure 2:
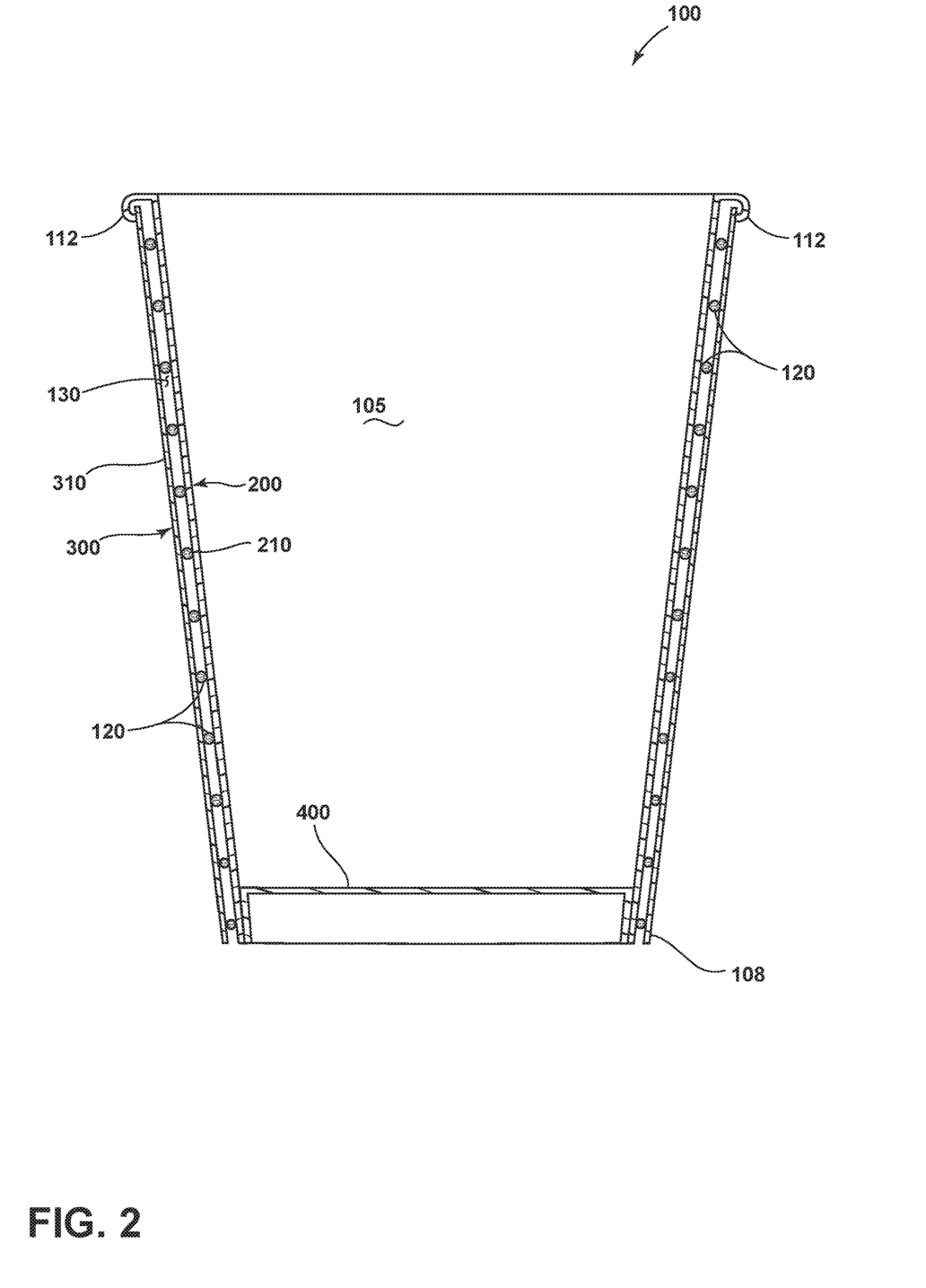
FIG. 2 is a cross-sectional view of the cup of FIG. 1.

Referring now in detail to the figures, and initially to FIGS. 1 and 2, there is shown an embodiment of a double walled container 100. The container 100 defines an interior volume or container cavity or receptacle 105 (see FIG. 2) for holding beverages or other items placed therein. In addition, the container 100 provides insulation properties.

Referring to FIG. 2, according to aspects of the disclosure, the container 100 includes an inner cup 200, an outer wrapper 300 (sometimes referred to as a sleeve), and a base element 400. The outer wrapper 300 is positioned around the inner cup 200 and held in spaced relationship therefrom to define a spaced condition between the inner cup 200 and the outer wrapper 300 that defines a cavity 130, which provide an insulation zone between the inner cup 200 and the outer wrapper 300.

The inner cup 200 defines an inner wall 210, which can be a sleeve, such that the sleeve together with the base element 400 or bottom form the inner cup 200. The outer wrapper 300 defines an outer wall 310. The inner cup 200 terminates in a rim 112 at its upper end, which can be provided as a rolled or at least partially rolled rim 112. The rim 112 of the inner cup 200 forms the rim 112 for the container 100. The inner wall 210 and outer wall 310 collectively form a double-walled sidewall 110 for the container 100, which is illustrated as having a frustoconical shape. However, other shapes are contemplated. The base element 400 functions as the bottom of the receptacle 105 in the double-wall configuration. The base element 400 is generally positioned in the lower portion of the container 100 and extends inwardly from the inner wall 210 such that the lower end of the container 100 (and of receptacle 105) is closed. The base element 400 can be recessed a vertical distance above a lowermost bottom edge 108 of the container sidewall 110.

While the container 100 and its structural features, including but not limited to the inner wall 210, outer wall 310, rim 112, and base element 400, are illustrated schematically herein, it will be understood that these features are not limited to a plain schematic appearance as illustrated herein, but can have additional structural features that are not disclosed here. For example, the lower portion of the base element 400, the inner wall 210, and/or the outer wall 310 can be provided with structural features that engage one another in ways not detailed in the illustrations herein, including but not limited to the incorporation of stacking features or spacing features. By further example, while the inner wall 210 and the outer wall 310 are illustrated herein as generally smooth-walled elements, it will be understood that the inner wall 210 and the outer wall 310 can include a variety of structurally raised or indented features, such as ribs, cusps, ridges, meshes, protuberances, bumps, channels, dimples, rings, etc. Further, any of the sidewall 110 surfaces can include one or more seams and/or overlapped portions due to manufacturing processes.

In an exemplary embodiment, the inner wall 210, the outer wall 310, and the base element 400 can be formed of a paper product. Further, the base element 400, the inner wall 210, and/or the outer wall 310 can further include any suitable surface texture or coating. However, it will be understood that the inner wall 210, the outer wall 310, and the base element 400 are not limited to being formed of a paper product. By way of non-limiting example, it is contemplated that the inner wall 210 and the base element 400 can be formed of a plastic or a foam, while the outer wall 310 can be formed of a paper product. It is possible for the inner wall 210, outer wall 310, and base element 400 be made from paper, foam, or foam coated paper, in any possible combination.

A spacer, illustrated in this embodiment as an adhesive 120, can be present within the cavity 130, and contacting both the inner wall 210 and the outer wall 310. While the spacer has been illustrated herein as an adhesive 120, it will be understood that the spacer can comprise any suitable spacing means such as, by way of non-limiting example, at least one of an adhesive, a bead, a strip of foam or other material, such as plastic, or a structural member protruding into the cavity 130 from at least one of the inner cup 200 or the outer wrapper 300. The adhesive 120 can further function to maintain the spaced condition of the inner wall 210 and the outer wall 310. The adhesive 120 can be applied in any suitable manner, including but not limited to, discrete applications in the form of dots, circles, or lines of adhesive 120, or a continuous application, such as a spiral, in any suitable pattern such that the adhesive 120 as applied has a height or width that maintains the inner wall 210 and the outer wall 310 in the spaced condition with one another, the adhesive 120 not being flat or substantially flat.

Turning now to FIGS. 3-6, a method of wrapping the outer wrapper 300 about the inner cup 200 to form the double-walled container 100 is illustrated. The sequence of steps depicted for this method is for illustrative purposes only, and is not meant to limit the method in any way as it is understood that the steps can proceed in a different logical order or additional or intervening steps can be included without detracting from the method of the disclosure.

Figure 3:
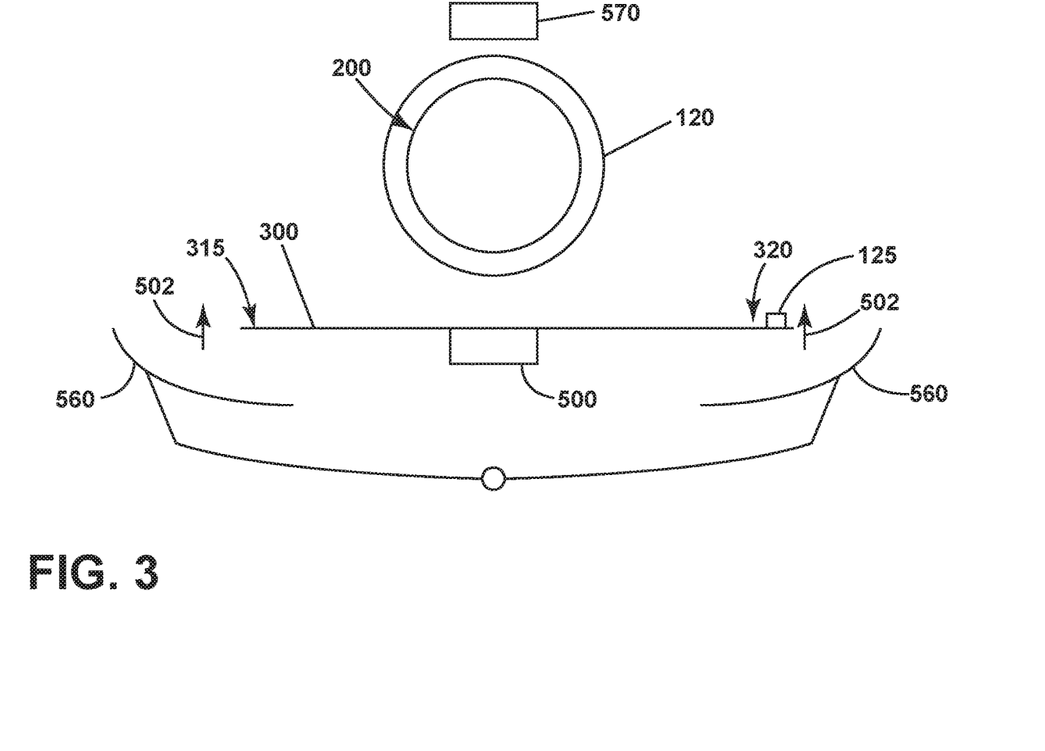
FIG. 3 is a schematic bottom view of the inner cup and the outer wrapper of FIG. 2 in a start position according to an embodiment of the disclosure.

FIG. 3 shows a bottom view of the inner cup 200 and the outer wrapper 300 in a start position. The method can begin with the inner cup 200 having been provided with the adhesive 120. The applying of the adhesive 120 can comprise multiple discrete applications of adhesive 120 at multiple locations on the inner cup 200. By way of non-limiting example, the multiple discrete applications of adhesive 120 can include dots, lines, or rings. The inner cup 200 can be held by, by way of non-limiting example, suction on a mandrel 550 (FIG. 7) that can be positioned within the receptacle 105 of the inner cup 200. The adhesive 120 is provided about the circumference of the inner cup 200. A press arm 570 is positioned above the inner cup 200 and spaced away from the inner cup 200.

The outer wrapper 300 overlies and is held by suction on a suction arm 500. In the start position, the outer wrapper 300 is flat and held out of contact with the adhesive 120 on the inner cup 200, but is vertically aligned with the inner cup 200 and is ready to be moved upward toward the inner cup 200 in the direction shown by the arrows 502. When the outer wrapper 300 in the pre-wrapped condition is placed such that it overlies the suction arm 500, suction is provided through the suction arm 500 in order to hold the outer wrapper 300 in place against the suction arm 500. In an exemplary embodiment, the suction arm 500 contacts the outer wrapper 300 at a location between opposing ends 315, 320 of the outer wrapper 300, generally at a point centrally located between the opposing ends 315, 320 of the outer wrapper 300. The outer wrapper 300 can be provided with an adhesive 125 applied on at least one or the other of the opposing ends 315, 320. In an exemplary embodiment, the adhesive 125 is applied to the opposing end 315, 320 that will overlie the other of the opposing ends 315, 320 when the outer wrapper 300 is wrapped around the inner cup 200. While the adhesive 125 is illustrated herein as being provided on the opposing end 320, it will be understood that the adhesive 125 can be provided on the other opposing end 315 in the case that the opposing end 315 were wrapped on the outside of the opposing end 320. Wrapping arms 560 are positioned below the outer wrapper 300 and generally adjacent to the opposing ends 315, 320. The wrapping arms 560 in the start position are lowered and not in contact with the outer wrapper 300.

Figure 4:
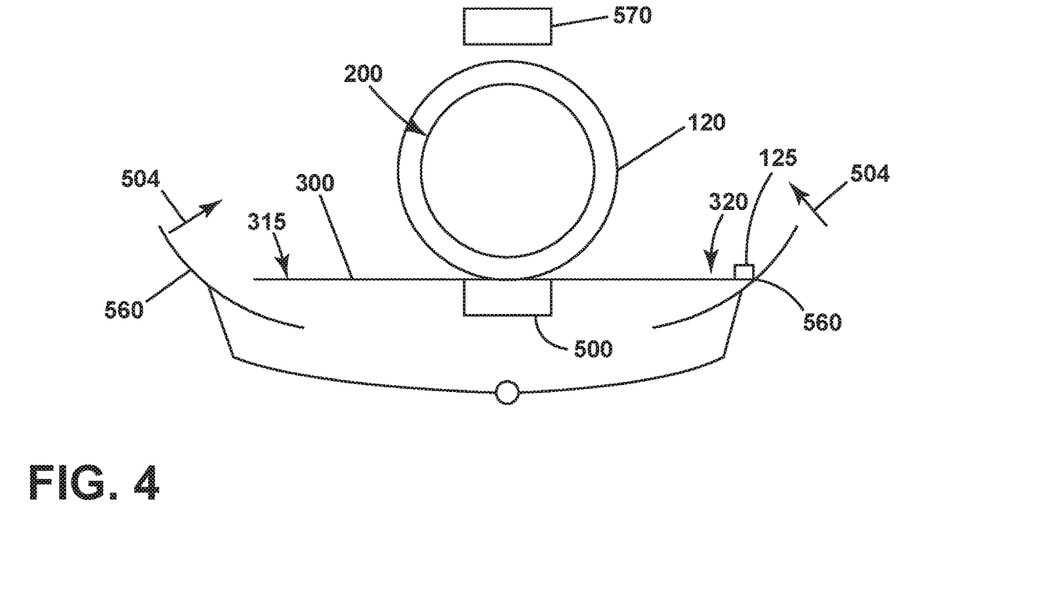
FIG. 4 is a schematic bottom view of the inner cup and the outer wrapper of FIG. 3 in a contacting position according to an embodiment of the disclosure.

FIG. 4 shows a bottom view of the inner cup 200 and the outer wrapper 300 in a contacting position. In the contacting position, at least one or both of the inner cup 200 and the outer wrapper 300 is moved toward the other of the inner cup 200 and the outer wrapper 300 such that the outer wrapper 300 is brought into physical contact with the adhesive 120 that has been applied to the inner cup 200. In an exemplary embodiment, while the outer wrapper 300 contacts the adhesive 120 on the inner cup 200, the inner cup 200 and the outer wrapper 300 are held in a spaced condition from one another such that the adhesive 120 is not substantially compressed by the contact between the inner cup 200 and the outer wrapper 300, maintaining the width of the cavity 130. In the contacting position, the wrapping arms 560 can begin to rotate inwardly towards the outer wrapper 300 in the direction indicated by the arrows 504. As the wrapping arms 560 rotate further inwardly and upwardly, in a curved arc of movement, towards the outer wrapper 300, the wrapping arms 560 urge the outer wrapper 300 about the inner cup 200, forcing the opposing ends 315, 320 of the outer wrapper 300 upwardly around the inner cup 200 in a circumferential manner, such that the outer wrapper 300 is wrapped about the inner cup 200 while still maintaining the outer wrapper 300 in the spaced condition. The outer wrapper 300 is wrapped about the inner cup 200 until the opposing ends 315, 320 overlap one another to define an overlapped portion 580 (see FIG. 5).

Figure 5:
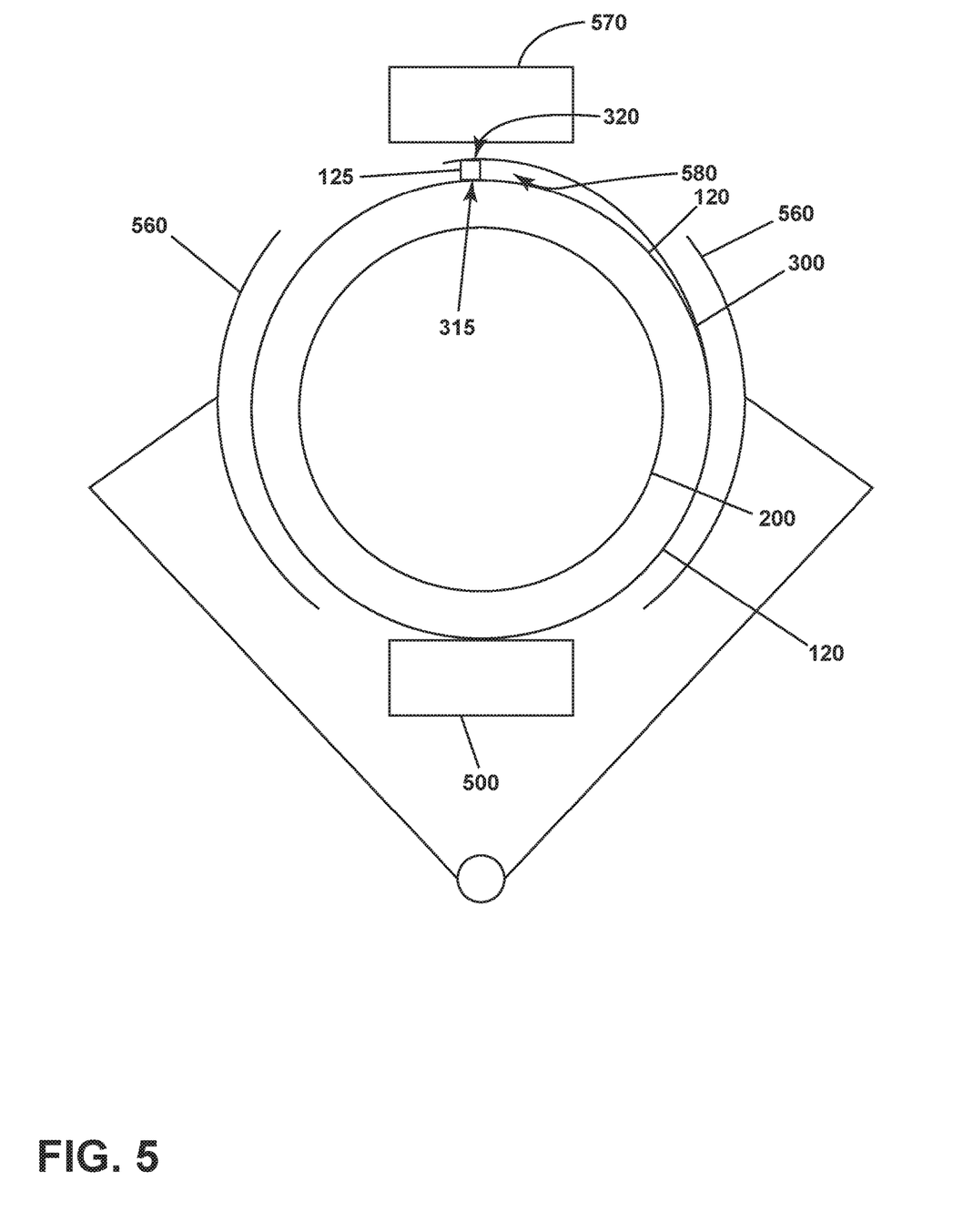
FIG. 5 is a schematic bottom view of the inner cup and the outer wrapper of FIG. 4 in a fully wrapped position according to an embodiment of the disclosure.

FIG. 5 shows a bottom view of the inner cup 200 and the outer wrapper 300 in a fully wrapped position. In the fully wrapped position, while the outer wrapper 300 and the inner cup 200 are still maintained in the spaced condition from one another, the outer wrapper 300 has been forced completely about the inner cup 200 by the wrapping arms 560 such that the opposing ends 315, 320 have been wrapped about the inner cup 200 completely to overlap one another and define the overlapped portion 580. The wrapping arms 560 are shaped and their movement controlled such that they maintain the cavity 130 about the circumference of the inner cup 200. As illustrated herein, the adhesive 125 applied to the opposing end 320 has come into contact with the other opposing end 315. The wrapping arms 560 have moved in the direction of the arrows 504 (FIG. 4) to their upward extent in the fully wrapped position. Further, the press arm 570 has begun to move downward toward the overlapped portion 580 of the outer wrapper 300.

Figure 6:
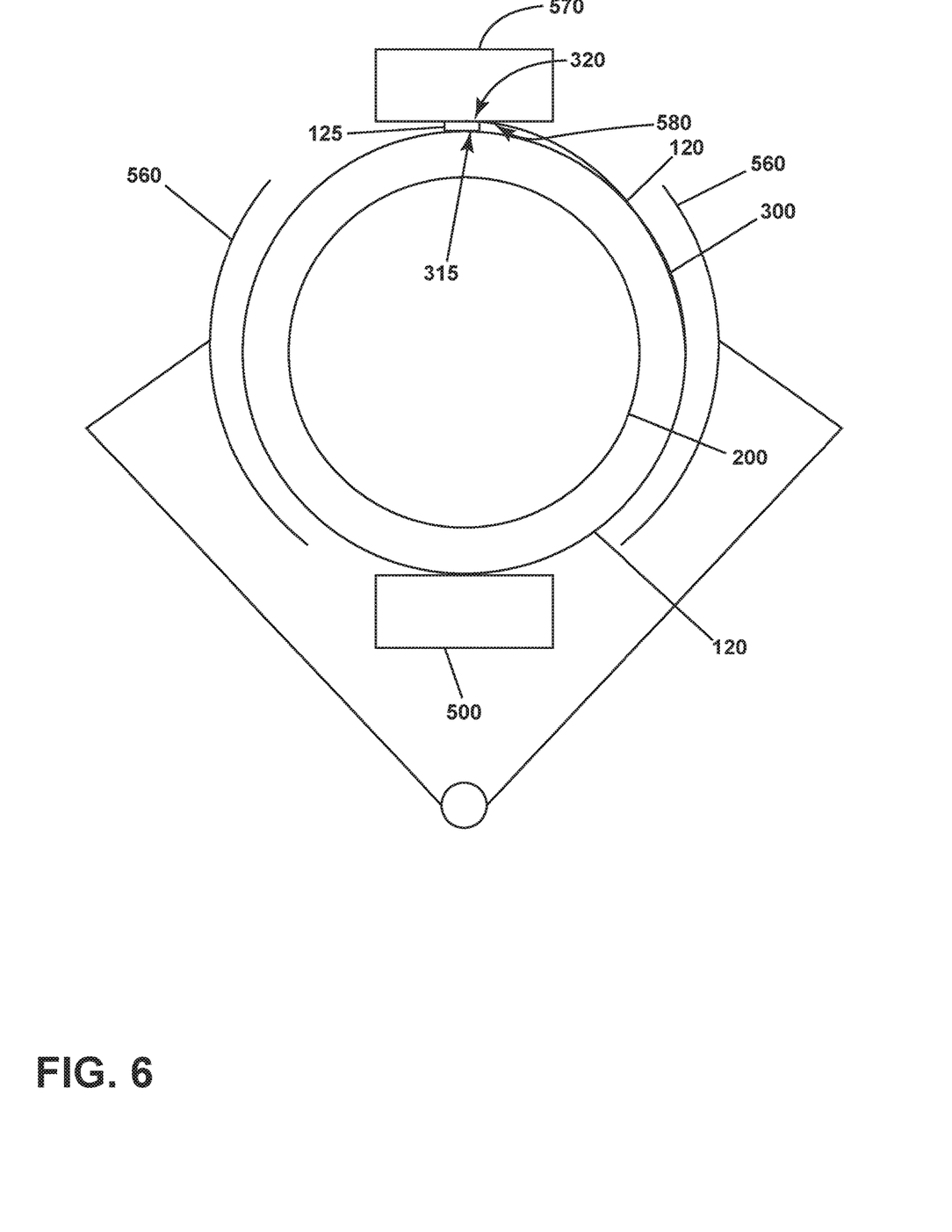
FIG. 6 is a schematic bottom view of the inner cup and the outer wrapper of FIG. 5 in the fully wrapped position with a press arm fully extended according to an embodiment of the disclosure.

FIG. 6 shows a bottom view of the inner cup 200 and the outer wrapper 300 in a fully wrapped position with the press arm 570 fully extended. When the press arm 570 is fully extended, the press arm 570 contacts the overlapped portion 580 and applies pressure to the overlapped portion 580 such that the overlapped portion 580 is pressed toward the inner cup 200. The pressing of the overlapped portion 580 toward the inner cup 200 compresses the adhesive 125 at least partially, but the pressing can be insufficient for the overlapped portion 580 to physically contact the inner cup 200. However, while the press arm 570 is illustrated herein as not pressing the overlapped portion 580 toward the inner cup 200 with sufficient force to cause the overlapped portion 580 to physically contact the inner cup 200, it will be understood that the press arm 570 can press the overlapped portion 580 toward the inner cup 200 with any suitable amount of pressure, up to and including that the pressure is sufficient to cause the overlapped portion 580 to be pressed completely against the inner cup 200. It is also contemplated that the press arm 570 can press the overlapped portion 580 such that it does not move toward the inner cup 200, or that the overlapped portion 580 can be compressed any suitable distance therebetween.

The press arm 570 can be held against the overlapped portion 580 for any suitable length of time such that the adhesive 125 that was applied to at least one of the opposing ends 315, 320 of the outer wrapper 300 can sufficiently bond to the other of the opposing ends 315, 320. When a suitable length of time has passed for the overlapped portion 580 to be sufficiently adhered together, the press arm 570 and the wrapping arms 560 are withdrawn from contact with the outer wrapper 300. When the wrapping has been completed, the application of suction to the outer wrapper 300 by the suction arm 500 is ceased so that the formed double-walled container 100 can then be indexed away from the wrapping station for packaging or for further processing, such as the addition of structural or stacking features, or for printing on the outer wrapper 300.

Figure 7:
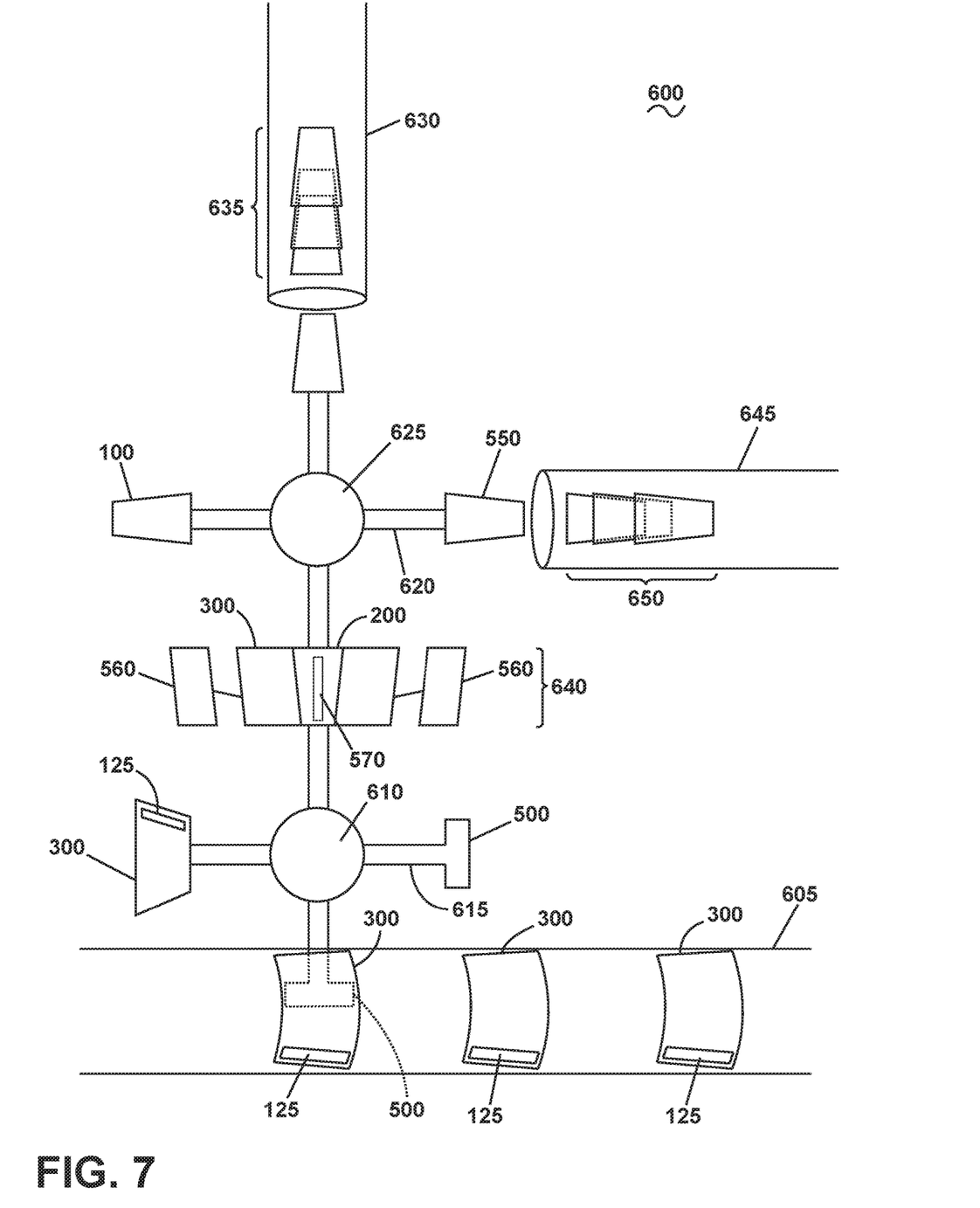
FIG. 7 is a schematic view of an assembly system for wrapping the outer wrapper about the inner cup to form the double-walled container of FIG. 2 according to an embodiment of the disclosure.

FIG. 7 illustrates a schematic view of an assembly system 600 for wrapping the outer wrapper 300 about the inner cup 200 to form the double-walled container 100. First, a web 605 carrying a plurality of outer wrappers 300 enters the assembly system 600. The outer wrapper 300 are illustrated herein as having already been provided with the adhesive 125. It will also be understood that the outer wrappers 300 on the web 605 might not yet include the adhesive 125, and that the adhesive 125 will rather be applied to the outer wrapper 300 at a later point during the wrapping process.

A first rotating spindle 610 has a plurality of extending arms 615 disposed radially about the first rotating spindle 610. At the end of each of the extending arms 615 is a suction arm 500. As a suction arm 500 is brought into alignment with an outer wrapper 300, the outer wrapper 300 is transferred to the suction arm 500 from the web 605 and is held in place on the suction arm 500 by suction force being applied by the suction arm 500. The suction arm 500 carrying the outer wrapper 300 is then rotated about the rotating spindle 610 until it is brought into alignment with the wrapping station 640. The suction arm 500 is also movable up/down relative to the outer wrapper 300. The wrapping station 640 includes the wrapping arms 560 and the press arm 570, with the wrapping arms 560 and the press arm 570 occupying the start position when the outer wrapper 300 is indexed into place in the wrapping station 640.

Before wrapping of the outer wrapper 300 can proceed, an inner cup 200 is provided to the wrapping station 640. A second rotating spindle 625 is provided that can carry the inner cups 200. The second rotating spindle 625 has a plurality of extending arms 620 disposed radially about the second rotating spindle 625. At the end of each of the extending arms 620 is a mandrel 550. The mandrel 550 can be provided with air channels (not shown) that allow the mandrel 550 to provide suction force to hold an inner cup 200 about the mandrel 550. A supply tube 645 can contain a stack 650 of inner cups 200. When a mandrel 550 lines up with the open end of the supply tube 645 and applies suction, an inner cup 200 can be sucked out of the supply tube 645 and onto the mandrel 550. The mandrel 550 is then rotated by the second rotating spindle 625 to index an inner cup 200 into position within the wrapping station 640. At the wrapping station 640, the outer wrapper 300 is wrapped about the inner cup 200 to form the double-walled container 100 as described in FIGS. 3-6.

When formation of the double-walled container 100 at the wrapping station 640 has been completed, the second rotating spindle 625 indexes the mandrel 550 carrying the double-walled container 100 out of the wrapping station. The double-walled container 100 can then be brought into alignment with a stacking tube 630. The stacking tube 630 can be provided to contain a stack 635 of double-walled containers 100. When the mandrel 550 carrying a double-walled container 100 lines up with the open end of the stacking tube 630, the application of suction to the double-walled container 100 by the mandrel 550 is ceased. The double-walled container can then be taken up into the stacking tube 630, either by the application of suction from the stacking tube 630, by being blown off the mandrel 550 by positive air pressure applied by the mandrel 550, or a combination thereof.

Figure 8:
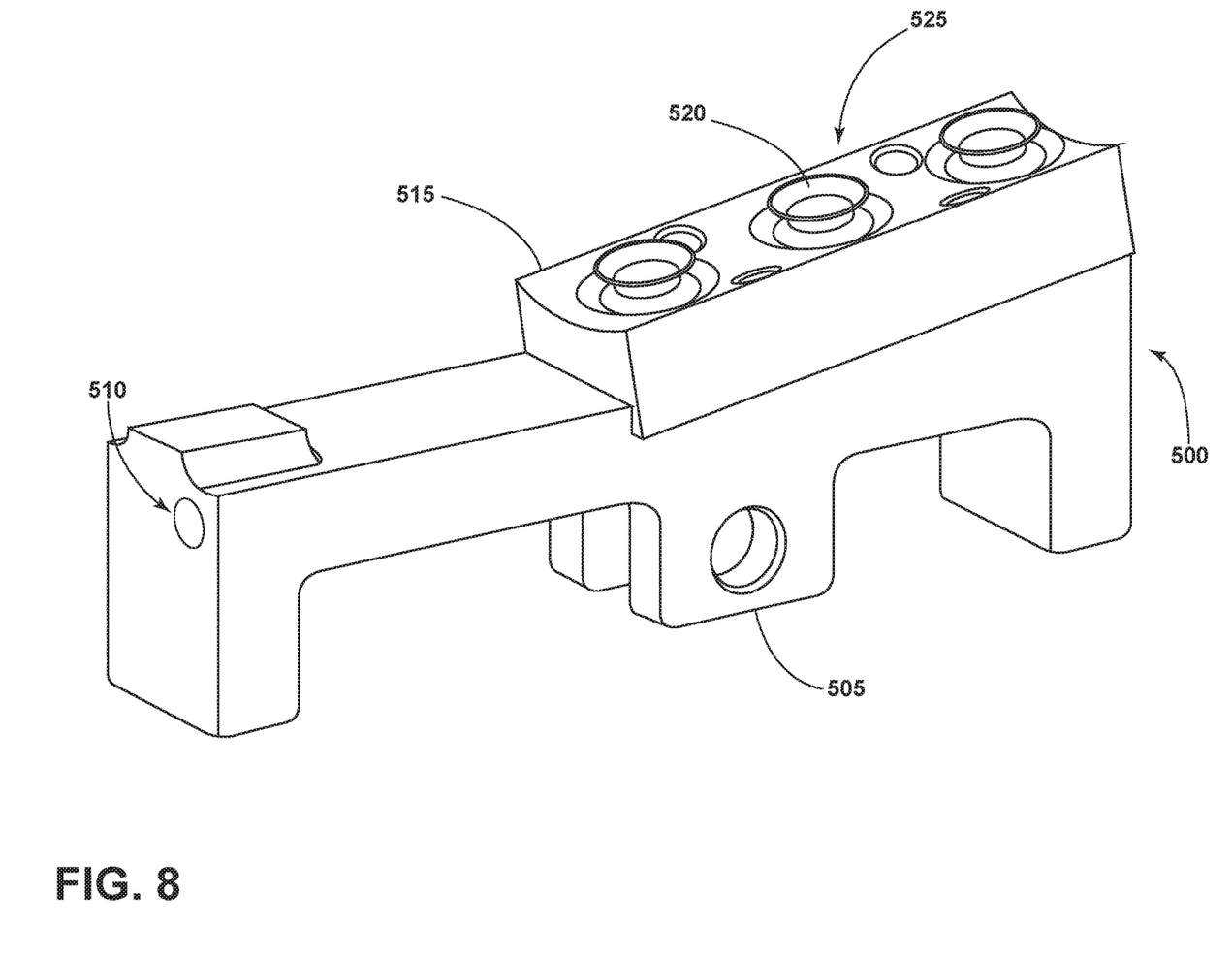
FIG. 8 is a perspective view of a suction apparatus that can be used to make the cup of FIG. 2 according to an embodiment of the disclosure.

Referring now to FIG. 8, a suction arm 500 that can be used in the assembly system 600 to make the double-walled container 100 according to an embodiment of the disclosure is illustrated. The suction arm 500 can include a base portion 505 that is generally stationary in relation to the extending arm 615 and can be provided in a substantially horizontal orientation. The base portion 505 can be operably coupled to a suction source (not shown) via a pressure opening 510. The suction arm 500 can further include an angled portion 515. The angled portion 515 is mechanically coupled to the base portion 505 and can be provided at an angle relative to the base portion 505. It is further contemplated that the angled portion 515 can be adjustable relative to the base portion 505 such that the angle of the angled portion 515 can be adjusted to accommodate the pitch of the container 100 to be assembled. In an exemplary embodiment, the angle of the angled portion 515 will be adjusted such that it corresponds to the angle of the inner wall 210 of the inner cup 200. At least one suction nozzle 520 can be provided extending from an upper surface 525 of the angled portion 515. The suction nozzles 520 can selectively provide suction or negative pressure to hold in place a blank or outer wrapper 300 that is applied to the angled portion 515.

Figure 9:
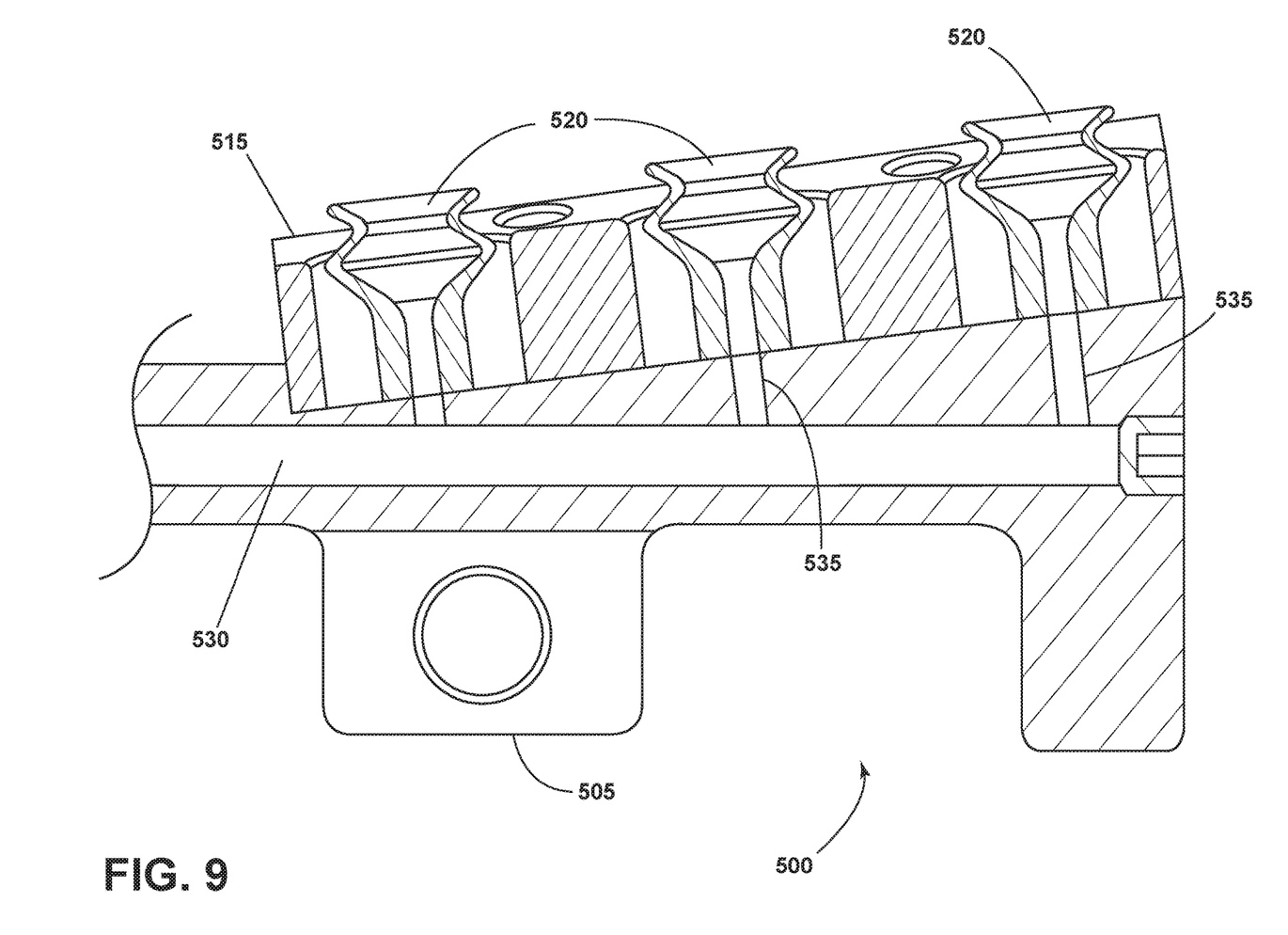
FIG. 9 is a side cross-sectional view of the suction apparatus of FIG. 8.

Referring now to FIG. 9, a side cross-sectional view of the suction arm 500 of FIG. 8 is shown. In this view, it can be better seen that the base portion 505 of the suction arm 500 can define a suction channel 530. The suction channel 530 can include suction branches 535. In an exemplary embodiment, the number of suction branches 535 is equal to the number of suction nozzles 520 that are provided on the angled portion 515. The suction branches 535 extend upwardly into the suction nozzles 520 to provide a suction force to the suction nozzles 520.

While the outer wrapper 300 and the inner cup 200 have been described herein as being held in the spaced condition to one another by the adhesive 120 that is applied to the inner cup 200 prior to the wrapping of the outer wrapper 300 about the inner cup 200, it will also be understood that a non-adhesive spacer could be used instead of or in addition to the adhesive 120 applied to the inner cup 200. The spacer will maintain the outer wrapper 300 and the inner cup 200 in the spaced condition to one another regardless of whether or not the spacer has adhesive properties. The spacer can comprise, by way of non-limiting example, at least one of an adhesive, a bead, a strip of foam or other material, or a structural member protruding into the cavity 130 from at least one of the inner cup 200 or the outer wrapper 300. A spacer with no adhesive properties would still result in a double-walled container 100 with the intended function and properties as the outer wrapper 300 and the inner cup 200 would be maintained in the spaced condition from one another, and the outer wrapper 300 would still be held in a fully wrapped condition about the inner cup 200 by way of the adhesive that is provided to at least one of the opposing ends 315, 320 of the outer wrapper 300 prior to wrapping of the outer wrapper 300 about the inner cup 200 to form the overlapped portion 580.

The presence of the spacer allows the outer wrapper 300 and the inner cup 200 to be maintained in the spaced condition from one another, even as the outer wrapper 300 is mechanically wrapped about the inner cup 200. In methods of forming a double-walled container in which the outer wrapper is pre-formed into a sleeve and then slid over the inner cup, maintaining the spaced condition of the inner cup and the outer wrapper does not pose the same manufacturing challenge as the two components are already sized and formed to fit in the spaced condition from one another. However, such a method of assembly can result in smearing of the adhesive between the inner cup and the outer wrapper, compromising the cavity and potentially resulting in deformations that could be unpleasant to the consumer. The wrapping method of the disclosure solves the issue of providing a method for forming a double-walled container in which the outer wrapper can be wrapped about the inner cup, rather than slid over the inner cup, to maintain the integrity of the adhesive pattern, as well as ensuring that the inner cup and the outer wrapper are maintained in the spaced condition through the assembly process to ensure the cavity is properly defined at all points.

The embodiments of the disclosure described herein provide a method of making a double-walled cup or container, which can be formed of paper, which can be used to provide a superior insulating cup by ensuring that the inner cup and the outer wrapper are maintained in a spaced condition from one another for optimal insulative performance of the cavity. If the spacer or adhesive were not present or were to become compressed, the width of the cavity between the inner cup and the outer wrapper would be decreased, which would negatively impact the insulative performance of the double-walled cup. The methods described herein allow for the manufacture of a double-walled cup in a way in which the spaced condition is maintained at a desired width with decreased opportunity for the spacer or adhesive to become undesirably compressed about the circumference of the cup.

To the extent not already described, the different features and structures of the various embodiments of the disclosure may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the disclosure has been specifically described in connection with certain specific embodiments thereof, it is to be understood that this is by way of illustration and not of limitation. Reasonable variation and modification are possible within the scope of the forgoing disclosure and drawings without departing from the spirit of the disclosure which is defined in the appended claims.

What is claimed is:

1. A method of making a double-wall cup having an inner cup defining an inner wall and an outer wrapper defining an outer wall, the method comprising:
   applying an adhesive on the inner wall;
   holding, by a suction force, a portion of the wrapper in place against a suction arm, the suction arm contacting the wrapper to provide the suction force at a point centrally located between opposing ends of the wrapper, the portion of the wrapper held in contact with the adhesive while in spaced relationship with the inner wall to define a spaced condition such that the adhesive is not substantially compressed;
   wrapping the opposing ends of the wrapper about the inner wall until the opposing ends overlap one another to define an overlapped portion, while holding, by the suction force, the wrapper in the spaced condition;
   holding a press arm against the overlapped portion for a length of time to complete the wrapping, such that the overlapped portion does not move toward the inner wall; and
   ceasing the suction force to the wrapper by the suction arm when the wrapping is completed.

2. The method of claim 1 wherein the applying the adhesive comprises multiple discrete applications of adhesive.

3. The method of claim 2 wherein the multiple discrete applications of adhesive comprise at least one of: dots, circles, or lines.

4. The method of claim 1 further comprising applying adhesive to at least one of the opposing ends along at least a portion of the overlapped portion.

5. The method of claim 4 wherein the applying adhesive to at least one of the opposing ends occurs prior to the overlapping of the opposing ends.

6. The method of claim 1 wherein the length of time comprises a suitable length of time for the overlapped portion to be sufficiently adhered together.

7. The method of claim 1 wherein the suction arm comprises a base portion and an angled portion that can be provided at an angle relative to the base portion.

8. The method of claim 7 wherein the angle of the angled portion relative to the base portion can be adjusted to accommodate a pitch of the double-wall cup.

9. The method of claim 7 wherein at least one suction nozzle extends from an upper surface of the angled portion to provide the suction force to the wrapper.

10. A method of making a double-wall cup comprising:
applying a spacer to an inner wall of a sleeve;
holding, by a suction force, a portion of a wrapper in place against a suction arm, the suction arm contacting the wrapper to provide the suction force at a point centrally located between opposing ends of the wrapper, the portion of the wrapper held in contact with the spacer while in spaced relationship with the inner wall to define a spaced condition such that the spacer is not substantially compressed;
wrapping the opposing ends of the wrapper about the inner wall until the opposing ends overlap one another to define an overlapped portion, while holding, by the suction force, the wrapper in the spaced condition;
holding a press arm against the overlapped portion for a length of time to complete the wrapping, such that the overlapped portion does not move toward the inner wall; and
ceasing the suction force to the wrapper by the suction arm when the wrapping is completed.

11. The method of claim 10 further comprising affixing a bottom to the sleeve to form an inner cup comprising the sleeve and the bottom.

12. The method of claim 10 wherein the applying the spacer comprises multiple discrete applications of spacers.

13. The method of claim 12 wherein the multiple discrete applications of spacers comprise at least one of: dots, circles, or lines.

14. The method of claim 10 further comprising applying adhesive to at least one of the opposing ends along at least a portion of the overlapped portion.

15. The method of claim 14 wherein the applying adhesive to at least one of the opposing ends occurs prior to the overlapping of the opposing ends.

16. The method of claim 10 wherein applying the spacer comprises applying at least one of an adhesive, a bead, a strip of foam, or a protruding structural member.

17. The method of claim 10 wherein the length of time comprises a suitable length of time for the overlapped portion to be sufficiently adhered together.

18. The method of claim 10 wherein the suction arm comprises a base portion and an angled portion that can be provided at an angle relative to the base portion.

19. The method of claim 18 wherein the angle of the angled portion relative to the base portion can be adjusted to accommodate a pitch of the double-wall cup.

20. The method of claim 18 wherein at least one suction nozzle extends from an upper surface of the angled portion to provide the suction force to the wrapper.

* * * * *